US011202148B1

(12) United States Patent
Kamdar et al.

(10) Patent No.: US 11,202,148 B1
(45) Date of Patent: Dec. 14, 2021

(54) SMART AUDIO WITH USER INPUT

(71) Applicant: Facebook, Inc., Menlo Park, CA (US)

(72) Inventors: Pratik Mukesh Kamdar, Palo Alto, CA (US); Subhash Chandra Bose Naripeddy, Campbell, CA (US); Vamsi Mynampati, San Francisco, CA (US); Sridhar Pilli, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/881,943

(22) Filed: May 22, 2020

(51) Int. Cl.
| | | |
|---|---|---|
| *H04R 3/04* | (2006.01) | |
| *G10L 21/0264* | (2013.01) | |
| *H04L 29/06* | (2006.01) | |
| *G06T 7/50* | (2017.01) | |
| *G06F 3/16* | (2006.01) | |
| *G10L 21/0208* | (2013.01) | |

(52) U.S. Cl.
CPC .............. *H04R 3/04* (2013.01); *G06F 3/167* (2013.01); *G06T 7/50* (2017.01); *G10L 21/0264* (2013.01); *H04L 65/60* (2013.01); *G10L 2021/02082* (2013.01)

(58) Field of Classification Search
USPC ........................ 381/74, 95, 98, 111, 122, 355
See application file for complete search history.

(56) References Cited

U.S. PATENT DOCUMENTS

| | | | |
|---|---|---|---|
| 9,699,583 B1* | 7/2017 | Lyren ...................... H04S 7/303 |
| 2018/0350380 A1* | 12/2018 | Kim ........................ G10L 25/78 |
| 2019/0082276 A1* | 3/2019 | Crow ................... H04R 25/554 |

\* cited by examiner

*Primary Examiner* — Yosef K Laekemariam
(74) *Attorney, Agent, or Firm* — Fenwick & West LLP (57) ABSTRACT

A communication system establishes a communication session with a communication device via a network and captures, via one or more cameras, a local area within a field of view of the one or more cameras. The local area includes one or more audio sources. The communication system receives, from the communication device, a selection of a respective audio source from the one or more audio source in the local area. The selection indicates that audio originating from the respective audio source is to be prioritized over other audio sources in the local area. The communication system tunes one or more microphones based on a depth of the respective audio source relative to the communication system to optimize reception of audio originating at the respective audio source by the one or more microphones.

20 Claims, 3 Drawing Sheets

SMART AUDIO WITH USER INPUT

BACKGROUND

This disclosure relates generally to configuring tuning parameters, and, more specifically, to configuring tuning parameters based on a depth of an audio source in a local area within a field of view of one or more cameras of a communication device.

Virtual communication sessions may be used to simulate in-person meetings with one or more users from various physical locations. While virtual communication sessions allow users to view and interact with remote users in real-time, a number of problems may arise in such virtual communication sessions. For example, if a speaking user alters their distance to a communication device being used for a virtual communication session, the speech quality of audio data captured and sent to a remote user may be reduced.

SUMMARY

This disclosure details a communication system that can optimize the reception of audio during a communication session based on an audio mode related to a depth of an audio source in a local area within a field of view of a camera of a communication device.

The communication system may use a user selection to tune one or more microphones of a communication session to optimize sound quality of audio data captured by the communication system. In particular, the communication system establishes a communication session with a remote communication device via a network. During the communication session, the communication system uses one or more cameras capture image data from a local area (i.e., physical environment) within a field of view of the one or more cameras of the communication system and one or more microphones to capture audio data from the local area, which includes one or more audio sources. Examples of communication sessions may include video calls with a remote communication device, video recordings, or interactions with a virtual assistant on the communication system. The communication system receives a user selection of a respective audio source from the one or more audio sources in the local area. The communication system captures tracking data describing the location of the audio source in the local area within the field of view of an integrated camera of the communication system. The user selection indicates that the audio originating from the respective audio source is to be prioritized over audio captured from other audio sources in the local area. The communication system tunes the one or more microphones based on a depth of the respective audio source relative to the communication system to optimize the reception of audio originating from the respective audio source by the one or more microphones.

In some embodiments, the communication system may determine whether the depth of the respective audio source relative to the communication system is outside a distance threshold. In response to determining that the depth is outside the distance threshold, the communication system tunes the one or more microphones in accordance with a far-field mode. In response to determining that the depth is within the distance threshold, the communication system tunes the one or more microphones in accordance with a near-field mode. The communication system may tune the one or more microphones by adjusting one or more tuning parameters of the one or more microphones. The tuning parameters may include an automatic gain control parameter, a noise suppression parameter, and an echo cancellation parameter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
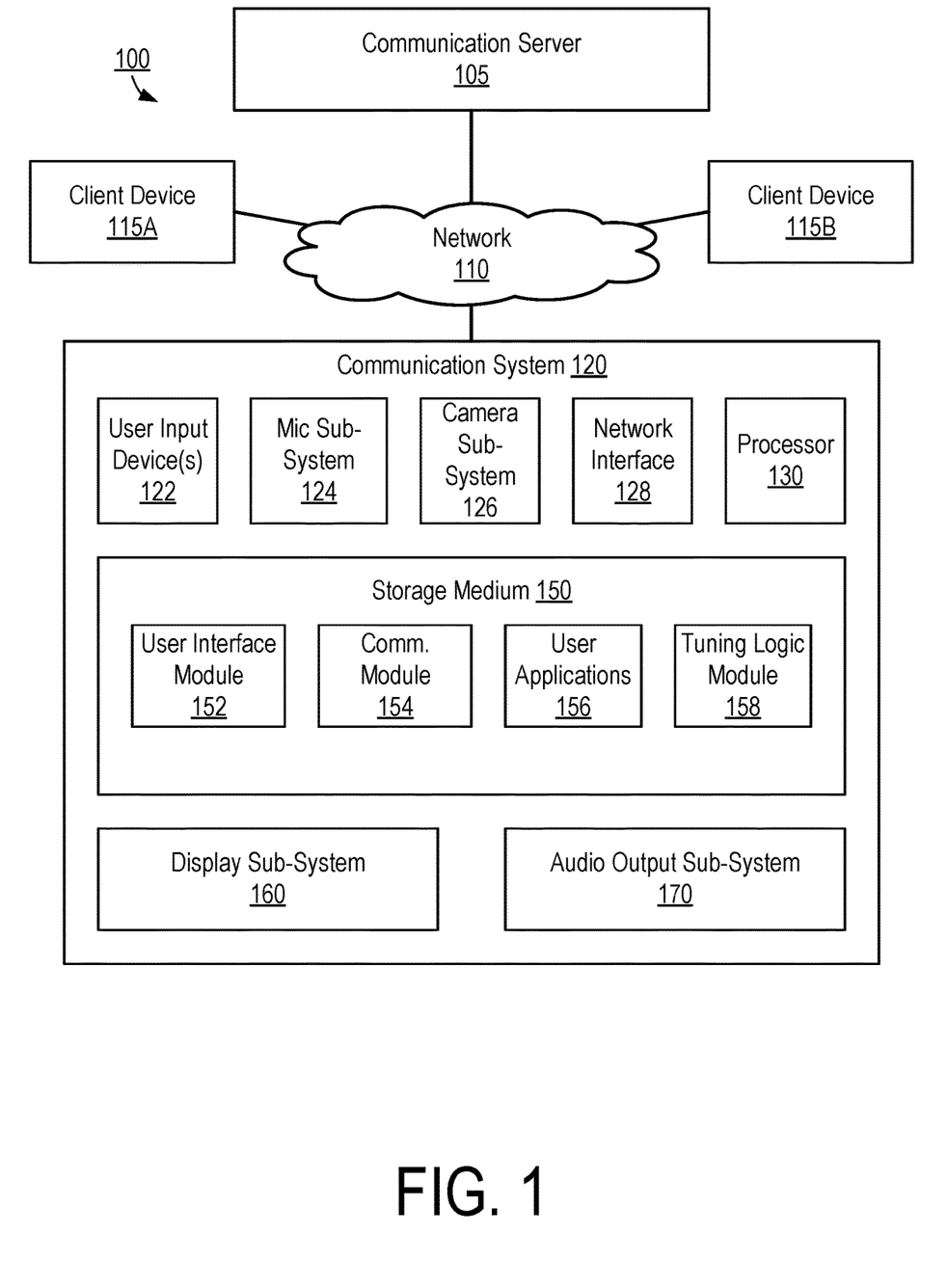
FIG. 1 is a block diagram of a system environment for a communication system, in accordance with an embodiment.

FIG. 1 is a block diagram of a system environment 100 for a communication system 120. The system environment 100 includes a communication server 105, one or more client devices 115 (e.g., client devices 115A, 115B), a network 110, and a communication system 120. In alternative configurations, different and/or additional components may be included in the system environment 100. For example, the system environment 100 may include additional client devices 115, additional communication servers 105, or additional communication systems 120.

In an embodiment, the communication system 120 comprises an integrated computing device that operates as a standalone network-enabled device. In another embodiment, the communication system 120 comprises a computing device for coupling to an external media device such as a television or other external display and/or audio output system. In this embodiment, the communication system may couple to the external media device via a wireless interface or wired interface (e.g., an HDMI cable) and may utilize various functions of the external media device such as its display, speakers, and input devices. Here, the communication system 120 may be configured to be compatible with a generic external media device that does not have specialized software, firmware, or hardware specifically for interacting with the communication system 120.

The client devices 115 are one or more computing devices capable of receiving user input as well as transmitting and/or receiving data via the network 110. In one embodiment, a client device 115 is a conventional computer system, such as a desktop or a laptop computer. Alternatively, a client device 115 may be a device having computer functionality, such as a personal digital assistant (PDA), a mobile telephone, a smartphone, a tablet, an Internet of Things (IoT) device, a video conferencing device, another instance of the communication system 120, or another suitable device. A client device 115 is configured to communicate via the network 110. In one embodiment, a client device 115 executes an application allowing a user of the client device 115 to interact with the communication system 120 by enabling voice calls, video calls, data sharing, or other interactions. For example, a client device 115 executes a browser application to enable interactions between the client device 115 and the communication system 105 via the network 110. In another embodiment, a client device 115 interacts with the communication system 105 through an application running on a native operating system of the client device 115, such as IOS® or ANDROID™.

The communication server 105 facilitates communications of the client devices 115 and the communication system 120 over the network 110. For example, the communication server 105 may facilitate connections between the communication system 120 and a client device 115 when a voice or video call is requested. Additionally, the communication server 105 may control access of the communication system 120 to various external applications or services available over the network 110. In an embodiment, the communication server 105 may provide updates to the communication system 120 when new versions of software or firmware become available. In other embodiments, various functions described below as being attributed to the communication system 120 can instead be performed entirely or in part on the communication server 105. For example, in some embodiments, various processing or storage tasks may be offloaded from the communication system 120 and instead performed on the communication server 120.

The network 110 may comprise any combination of local area and/or wide area networks, using wired and/or wireless communication systems. In one embodiment, the network 110 uses standard communications technologies and/or protocols. For example, the network 110 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 110 may be encrypted using any suitable technique or techniques.

The communication system 120 includes one or more user input devices 122, a microphone sub-system 124, a camera sub-system 126, a network interface 128, a processor 130, a storage medium 150, a display sub-system 160, and an audio sub-system 170. In other embodiments, the communication system 120 may include additional, fewer, or different components.

The user input device 122 comprises hardware that enables a user to interact with the communication system 120. The user input device 122 can comprise, for example, a touchscreen interface, a game controller, a keyboard, a mouse, a joystick, a voice command controller, a gesture recognition controller, a remote control receiver, or other input device. In an embodiment, the user input device 122 may include a remote control device that is physically separate from the user input device 122 and interacts with a remote controller receiver (e.g., an infrared (IR) or other wireless receiver) that may integrated with or otherwise connected to the communication system 120. In some embodiments, the display sub-system 160 and the user input device 122 are integrated together, such as in a touchscreen interface. In other embodiments, user inputs may be received over the network 110 from a client device 115. For example, an application executing on a client device 115 may send commands over the network 110 to control the communication system 120 based on user interactions with the client device 115. In other embodiments, the user input device 122 may include a port (e.g., an HDMI port) connected to an external television that enables user inputs to be received from the television responsive to user interactions with an input device of the television. For example, the television may send user input commands to the communication system 120 via a Consumer Electronics Control (CEC) protocol based on user inputs received by the television.

The microphone sub-system 124 comprises one or more microphones (or connections to external microphones) that capture ambient audio signals by converting sound into electrical signals that can be stored or processed by other components of the communication system 120. The captured audio signals may be transmitted to the client devices 115 during an audio/video call or in an audio/video message. Additionally, the captured audio signals may be processed to identify voice commands for controlling functions of the communication system 120. In an embodiment, the microphone sub-system 124 comprises one or more integrated microphones. Alternatively, the microphone sub-system 124 may comprise an external microphone coupled to the communication system 120 via a communication link (e.g., the network 110 or other direct communication link). The microphone sub-system 124 may comprise a single microphone or an array of microphones. In the case of a microphone array, the microphone sub-system 124 may process audio signals from multiple microphones to generate one or more beamformed audio channels each associated with a particular direction (or range of directions).

The camera sub-system 126 comprises one or more cameras (or connections to one or more external cameras) that captures images and/or video signals. The captured images or video may be sent to the client device 115 during a video call or in a multimedia message, or may be stored or processed by other components of the communication system 120. Furthermore, in an embodiment, images or video from the camera sub-system 126 may be processed to for body detection, face detection, face recognition, gesture recognition, or other information that may be utilized to control functions of the communication system 120. In an embodiment, the camera sub-system 126 includes one or more wide-angle cameras for capturing a wide, panoramic, or spherical field of view of a surrounding environment. The camera sub-system 126 may include integrated processing to stitch together images from multiple cameras, or to perform image processing functions such as zooming, panning, dewarping, or other functions. In an embodiment, the camera sub-system 126 may include multiple cameras positioned to capture stereoscopic (e.g., three-dimensional images) or may include a depth camera to capture depth values for pixels in the captured images or video.

The network interface 128 facilitates connection of the communication system 120 to the network 110. For example, the network interface 130 may include software and/or hardware that facilitates communication of voice, video, and/or other data signals with one or more client devices 115 to enable voice and video calls or other operation of various applications executing on the communication system 120. The network interface 128 may operate according to any conventional wired or wireless communication protocols that enable it to communication over the network 110.

The display sub-system 160 comprises an electronic device or an interface to an electronic device for presenting images or video content. For example, the display sub-system 160 may comprises an LED display panel, an LCD display panel, a projector, a virtual reality headset, an augmented reality headset, another type of display device, or an interface for connecting to any of the above-described display devices. In an embodiment, the display sub-system 160 includes a display that is integrated with other components of the communication system 120. Alternatively, the display sub-system 120 comprises one or more ports (e.g., an HDMI port) that couples the communication system to an external display device (e.g., a television).

The audio output sub-system 170 comprises one or more speakers or an interface for coupling to one or more external speakers that generate ambient audio based on received audio signals. In an embodiment, the audio output sub-system 170 includes one or more speakers integrated with other components of the communication system 120. Alternatively, the audio output sub-system 170 comprises an interface (e.g., an HDMI interface or optical interface) for coupling the communication system 120 with one or more external speakers (for example, a dedicated speaker system or television). The audio output sub-system 120 may output audio in multiple channels to generate beamformed audio signals that give the listener a sense of directionality associated with the audio. For example, the audio output sub-system may generate audio output as a stereo audio output or a multi-channel audio output such as 2.1, 3.1, 5.1, 7.1, or other standard configuration.

In embodiments in which the communication system 120 is coupled to an external media device such as a television, the communication system 120 may lack an integrated display and/or an integrated speaker, and may instead only communicate audio/visual data for outputting via a display and speaker system of the external media device.

The processor 130 operates in conjunction with the storage medium 150 (e.g., a non-transitory computer-readable storage medium) to carry out various functions attributed to the communication system 120 described herein. For example, the storage medium 150 may store one or more modules or applications (e.g., user interface 152, communication module 154, user applications 156, tuning logic module 158) embodied as instructions executable by the processor 130. The instructions, when executed by the processor, cause the processor 130 to carry out the functions attributed to the various modules or applications described herein. In an embodiment, the processor 130 may comprise a single processor or a multi-processor system.

In an embodiment, the storage medium 150 comprises a user interface module 152, a communication module 154, user applications, and tuning logic module 158. In alternative embodiments, the storage medium 150 may comprise different or additional components.

The user interface module 152 comprises visual and/or audio elements and controls for enabling user interaction with the communication system 120. For example, the user interface module 152 may receive inputs from the user input device 122 to enable the user to select various functions of the communication system 120. In an example embodiment, the user interface module 152 includes a calling interface to enable the communication system 120 to make or receive voice and/or video calls over the network 110. To make a call, the user interface module 152 may provide controls to enable a user to select one or more contacts for calling, to initiate the call, to control various functions during the call, and to end the call. To receive a call, the user interface module 152 may provide controls to enable a user to accept an incoming call, to control various functions during the call, and to end the call. For video calls, the user interface module 152 may include a video call interface that displays remote video from a client 115 together with various control elements such as volume control, an end call control, or various controls relating to how the received video is displayed or the received audio is outputted.

The user interface module 152 may furthermore enable a user to access user applications 156 or to control various settings of the communication system 120. In an embodiment, the user interface module 152 may enable customization of the user interface according to user preferences. Here, the user interface module 152 may store different preferences for different users of the communication system 120 and may adjust settings depending on the current user.

The communication module 154 facilitates communications of the communication system 120 with clients 115 for voice and/or video calls. For example, the communication module 154 may maintain a directory of contacts and facilitate connections to those contacts in response to commands from the user interface module 152 to initiate a call. Furthermore, the communication module 154 may receive indications of incoming calls and interact with the user interface module 152 to facilitate reception of the incoming call. The communication module 154 may furthermore process incoming and outgoing voice and/or video signals during calls to maintain a robust connection and to facilitate various in-call functions. The communication module 154 may additionally facilitate communications of the communication system 120 with one or more virtual assistants. Virtual assistants may be accessible via one or more user applications 156 or applications connected through the communication server 105 or another external server. The communication module 154 may process incoming voice signals for the virtual assistant and output audio signals from the virtual assistant via the audio output sub-system 170.

The user applications 156 comprise one or more applications that may be accessible by a user via the user interface module 152 to facilitate various functions of the communication system 120. For example, the user applications 156 may include a web browser for browsing web pages on the Internet, a picture viewer for viewing images, a media playback system for playing video or audio files, an intelligent virtual assistant for performing various tasks or services in response to user requests, or other applications for performing various functions. In an embodiment, the user applications 156 includes a social networking application that enables integration of the communication system 120 with a user's social networking account. Here, for example, the communication system 120 may obtain various information from the user's social networking account to facilitate a more personalized user experience. Furthermore, the communication system 120 can enable the user to directly interact with the social network by viewing or creating posts, accessing feeds, interacting with friends, etc. Additionally, based on the user preferences, the social networking application may facilitate retrieval of various alerts or notifications that may be of interest to the user relating to activity on the social network. In an embodiment, users may add or remove applications 156 to customize operation of the communication system 120.

The tuning logic module 158 configures tuning parameters to process audio data captured by the communication system 120 during communication sessions. The tuning logic module 158 receives a user input from the user input device 122 and tracking data received from the camera sub-system 126 during a communication session. The tuning logic module determines, based on the user input and the tracking data, an audio mode for the communication session and configures tuning parameters based on the determined audio mode. The tuning logic module 158 is further described in relation to FIG. 2.

Figure 2:
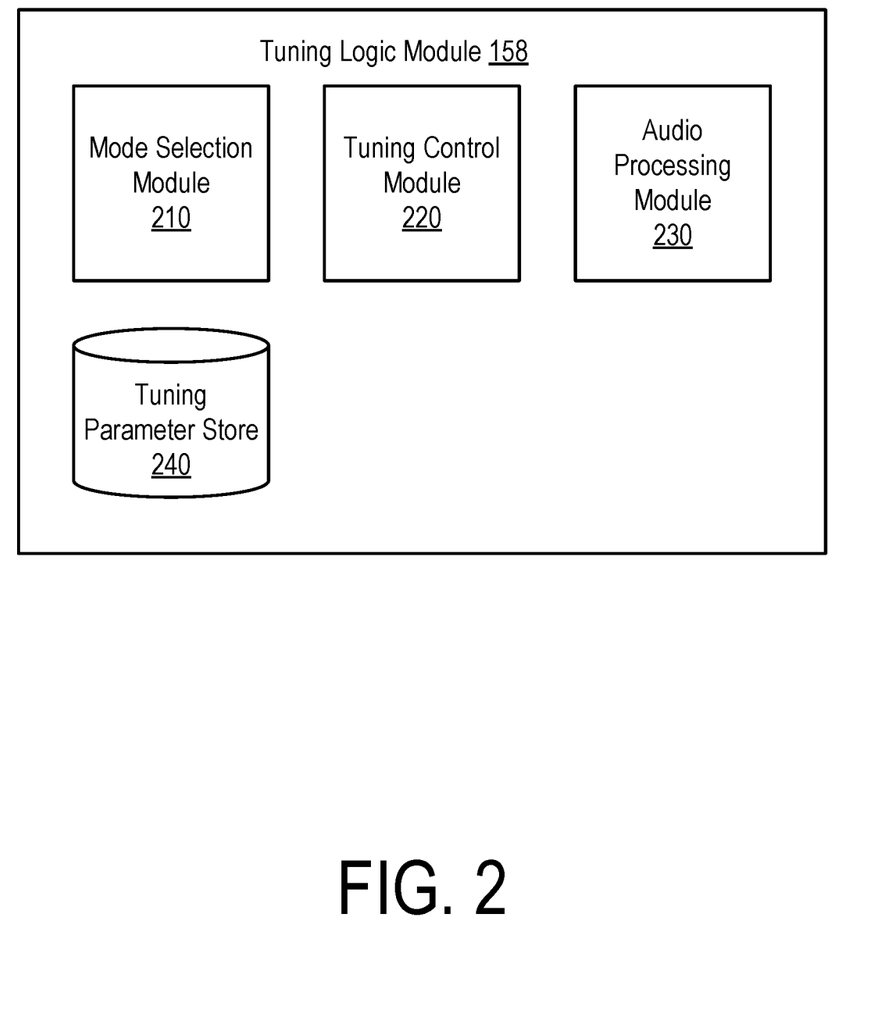
FIG. 2 is a block diagram of a tuning logic module, in accordance with one embodiment.

FIG. 2 is a block diagram of the tuning logic module 158, in accordance with one embodiment. The tuning logic module 158 includes a mode selection module 210, a tuning control module 220, an audio processing module 230, and a tuning parameter store 240. In some embodiments, the tuning logic module 158 may include additional, fewer, or different components for various applications. The tuning logic module 158 may be located at the communication system 120 or at a connected client device 115 or external server.

The mode selection module 210 selects an audio mode for a communication session based on one or more user inputs and/or tracking data received from the camera sub-system 126 during a communication session. The mode selection module 210 may communicate with the communication module 154 to determine when a communication session between the communication system 120 and one or more remote client devices 115 is established. Examples of communication sessions include video calls, video recordings, and interactions with an application including a virtual assistant.

The mode selection module 210 may select from a plurality of audio modes for a communication session. Each audio mode is associated with a set of tuning parameters that optimize the audio data captured for the communication session based on the depth of an audio source in a local area (i.e. physical space or environment) within the field of view of the camera sub-system 126 of the communication system 120. For example, a near-field mode may be associated with tuning parameters that optimize the audio data for an audio source that is at or within a distance threshold from the communication system 120, and a far-field mode may be associated with tuning parameters that optimize the audio data for an audio source that is outside of the distance threshold from the communication system 120. Other audio modes include a virtual assistant mode that optimizes the tuning parameters for a communication session between a speaking user and a virtual assistant and audio modes for audio sources at various depths in the local area, such as a mid-field mode for an audio source located at the distance threshold. The tuning parameters for the audio modes are further described in relation to the tuning control module 220.

In some instances, the mode selection module 210 may select an audio mode that is directly specified by a user input received at the communication system 120, e.g., via a voice command or direct interaction. User inputs may be captured by the user input device 122 or may be received via audio data captured by the microphone sub-system 124 and/or image data captured by the camera sub-system 126. Example user inputs include selections from a plurality of interactive elements on a touchscreen interface, user requests to a virtual assistant, and voice commands indicating an audio mode. In some embodiments, the mode selection module 210 may additionally receive user inputs from one or more remote client devices 115 connected in the communication sessions.

In other instances, the mode selection module 210 may select an audio mode based on a user selection of a specific audio source to be prioritized over other audio sources in the local area. The audio source may be a specific user, object, or other focal point emitting audio signals in the local area within the field of view of the camera sub-system 126 of the communication system 120. The user selection may comprise a voice input indicating a name of a user or object in the local area or a voice input indicating to focus on the user who gave the voice input (e.g., the user could say "focus on me"). Further, the user selection may be an interaction via a touchscreen interface selecting a focal point in the local area as the audio source or a gesture-based interaction indicating an audio source (e.g., pointing to a user or object). The user selection may be received at the communication system 120 or from a remote client device 115 during the communication session.

The mode selection module 210 determines a depth of the audio source based on tracking data received from the camera sub-system 126. The tracking data may comprise three-dimensional (3D) locations of users and objects in the local area determined from image data captured from within the field of view of the camera sub-system 126. In some embodiments, the tracking data may further comprise a depth map of each pixel or object (i.e. group of pixels) in the image data of the environment relative to the communication system 120. The mode selection module 210 selects an audio mode that tunes microphone sub-system 124 to optimize the reception of audio signals originating from the audio source during the communication session. The mode selection module 210 may select an audio mode based on whether the depth of the audio source relative to the communication system 120 is outside or at or within a distance threshold. For example, if the depth of the audio source relative to the communication system is at or within the distance threshold from the communication system 120 (e.g., less than 2 meters from the camera), the mode selection module 210 selects the near-field mode. Further, if the depth of the audio source relative to the communication system is outside the distance threshold from the communication system 120, the mode selection module 210 selects the far-field mode.

In some embodiments, the mode selection module 210 may select an audio mode based on both a user selection of an audio source and a user input indicating an audio mode for the audio source. For example, the mode selection module 210 may receive a user selection of a user or object in the local area to focus on as the audio source from among multiple audio sources in the local area. The mode selection module 210 may receive a user input indirectly indicating an audio mode. For instance, the user input may indicate to highlight (i.e. focus on audio signals from) or suppress (i.e., remove audio signals from) the audio source. In this example, if the depth of the audio source relative to the communication system 120 is outside the distance threshold, the mode selection module 210 may select the far-field mode to highlight the audio source and select the near-field mode to suppress the audio source. Further, the mode selection module 210 may dynamically update the audio mode as the audio source moves around the local area. For example, if the audio source (relative to the communication system 120) moves from outside the distance threshold to within the distance threshold, the mode selection module 210 may automatically update from the far-field mode to the near field mode to highlight the audio source. In another example, instead of specifying a user or object as the audio source, the user selection may indicate a magnification factor of how much to magnify a view of the local area during the communication session. In this example, the audio source may be the portion of the local area within the magnified view.

In some embodiments, the mode selection module 210 selects the audio mode based an application executing on the communication system. Each application may be associated with an audio mode based on contextual information describing a typical depth of the user in the local area while using the application. For example, for an application that requires a user to input information via a user interface of the communication system 120, the mode selection module 210 may select the near-field mode since the user must within the distance threshold to input the information. In other embodiments, if the application includes a virtual assistant, the mode selection module 210 selects the virtual assistant mode, which optimizes the captured audio data for processing by the virtual assistant. Further, the mode selection module 210 may select the audio mode based on content of the communication session, volume level of the communication session, information describing the type of communication session, and/or information describing an external media device connected to the communication system 120.

In some embodiments, the mode selection module 210 automatically selects an audio mode for a communication session without a user input. In these embodiments, the mode selection module 210 receives image data and tracking data in real-time from the camera sub-system 126. If the image data depicts more than one user in the local area, the mode selection module 210 uses body and facial detection on the image data to detect which user is speaking and tracks the location (and, implicitly, the depth) of the user as the user moves around the local area using the tracking data. The mode selection module 210 may select an audio mode based on the depth of the speaking user relative to the communication system 120 and update the audio mode as the speaking user's depth in the local area changes. For example, if the speaking user moves from outside the distance threshold to within the distance threshold from the communication system 120, the mode selection module 210 may switch from the near-field mode to the far-field mode.

The tuning control module 220 sets tuning parameters to process the audio data of a communication session based on a selected audio mode. The tuning control module 220 receives the selected audio mode from the mode selection module 210 and sets the tuning parameters for the captured audio data based on the audio mode. The tuning parameters may set automatic gain control, noise suppression, and echo cancellation for the processing, which are each controlled by an automatic gain control parameter, a noise suppression parameter, and an echo cancellation parameter (or, alternatively, an echo suppression parameter), respectively. In some embodiments, the tuning control module 220 may set other tuning parameters, such as various beamforming parameters, which may be used when processing the audio data to extract audio signals from the audio source.

Altering the tuning parameters may have various effects on the audio data upon processing. For instance, altering the automatic gain control parameter results in controlling the variation of amplitude in audio signals from an audio source after processing. For example, altering the automatic gain control parameter controls the strength of an automatic gain control algorithm applies a stronger dynamic range reduction to the audio data such that the processed audio data is closer to a baseline value over a wider range of input values. When the automatic gain control parameter is set lower, the automatic gain control algorithm applies a weaker dynamic range reduction to the audio data such that the processed audio data may vary more widely over the same range of input values. Further, altering the noise suppression parameter controls how strongly noise is filtered from audio data received during the communication session. For example, setting the noise suppression parameter relatively higher more strongly filters out noise from the audio data but may also remove portions of the desired audio signals from the audio source. Alternatively, setting the noise suppression parameter relatively lower applies less strong filtering and better preserves the desired audio signals in the audio data. Further, altering the echo cancellation parameter results in controlling echo in the audio data. For example, setting the echo cancellation parameter higher removes more echo or repetitive audio signals from the audio data.

The tuning control module 220 sets the tuning parameters for each audio mode to optimize the signal-to-noise ratio of the audio data for the depth of the audio source in the local area. For example, for the near-field mode, the tuning control module 220 sets the tuning parameters for a higher signal-to-noise ratio than for the far-field mode. In particular, the tuning control module 220 may set the automatic gain control parameter lower for the near-field mode than the far-field mode, the noise suppression parameter higher for the near-field mode than the far-field mode, and the echo cancellation parameter higher for the near-field mode than the far-field mode. For an audio source at or less than the distance threshold from the communication system 120, the near-field mode may reduce amplification of background noise during a communication session. Further, the far-field mode may boost audio signals in the audio data received from an audio source outside of the distance threshold.

In some embodiments, each audio mode is associated with the tuning parameters stored in the tuning parameter store 240, and the tuning control module 220 sets the tuning parameters to those stored in the tuning parameter store 240 for the selected audio mode. Further, the tuning control module 220 may adjust the tuning parameters based on the depth of an audio source in the local area determined using on the tracking data. For example, the tuning control module 220 may set the automatic gain control parameter higher for an audio source located 4 meters from the communication system 120 than for an audio source that is 3 meters from the communication system 120. The tuning control module 220 may store the adjusted tuning parameters in the tuning parameter store 240.

Though in some embodiments the tuning parameters may be set based on a depth of the audio source in the local area, the tuning control module 240 sets the tuning parameters for the virtual assistant mode independent of the depth of the audio source. Since virtual assistants may be trained on unprocessed audio data, the tuning control module 220 sets the tuning parameters to capture more natural speech in the audio data upon processing and may set the automatic gain control parameter lower than for the near-field mode, the low noise suppression parameter lower than for the far-field mode, and the echo cancellation parameter lower than a threshold value. In some embodiments, the tuning control module 220 may retrieve these tuning parameters for the virtual assistant mode from the tuning parameter store 240.

The audio processing module 230 applies tuning parameters to process the audio data captured by the microphone sub-system 124 of the communication system 120. The audio processing module 230 receives a set of tuning parameters from the tuning control module 220 and sets the automatic gain control, noise suppression, and echo cancellation based on the tuning parameters. The audio processing module 230 processes the audio data based on the tuning parameters, which is more bandwidth-efficient than processing at the communication server 105 or one or more remote client devices 115.

Figure 3:
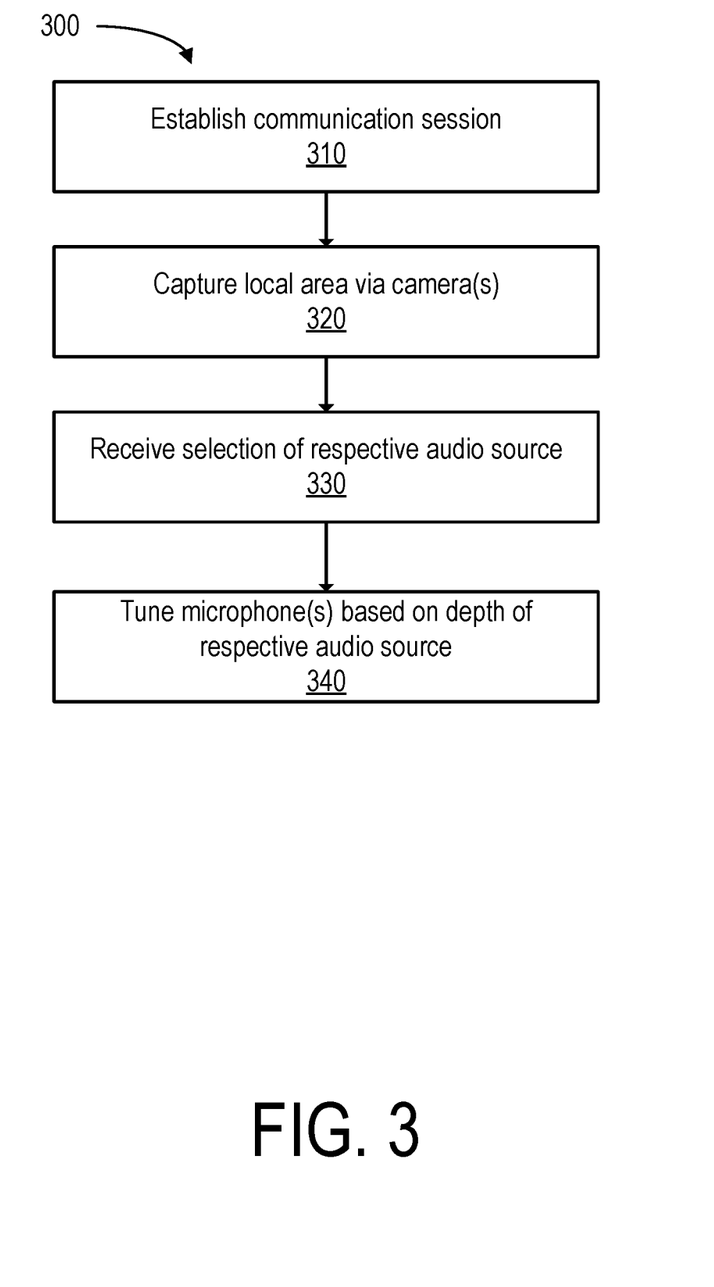
FIG. 3 is a flowchart illustrating a process for tuning one or more microphones of the microphone sub-system based on a depth of an audio source in a local area, in accordance with an embodiment.

FIG. 3 is a flowchart illustrating a process 300 for tuning one or more microphones of the microphone sub-system based on a depth of an audio source in a local area, in accordance with an embodiment. The steps of FIG. 3 may be performed by the tuning logic module 158, though in other embodiments, some or all of the steps may be performed by other entities or systems. In addition, other embodiments may include different, additional, or fewer steps, and the steps may be performed in different orders.

A communication system 120 selects an audio mode from a plurality of audio modes to tune one or more microphones of the microphone subsystem 124 to capture audio signals at the communication system 120. The audio modes may include a near-field mode, a far-field mode, and a virtual assistant mode. The near-field mode is tuned for an audio source at or within a distance threshold from the communication system 120, and the far-field mode is tuned for an audio source outside the distance threshold from the communication system 120. The virtual assistant mode is tuned for capturing unprocessed audio data, similar to audio data a virtual assistant would be trained on. Each audio mode may be associated with a set of tuning parameters, and the tuning parameters may adjust automatic gain control, noise suppression, and echo cancellation for communication sessions. The communication system 120 may store the tuning parameters in the tuning parameter store 240.

The communication system 120 establishes 310 a communication session. The communication session may be a video call, a video recording, or any interaction between a user and the communication system 120 involving the capture of audio data and image data. In some embodiments, the communication system 120 may establish the communication session with a remote client device 115, or, in some embodiments, another communication system, via the network 110. In other embodiments, the communication session may be with one or more of the user applications 156 or one or more external applications accessed via the communication server 105, such as an application including a virtual assistant.

The communication system 120 captures 320, via the camera sub-system 120, image data of a local area within a field of view of the camera sub-system 126. The local area may include one or more audio sources. The communication system 120 receives 330, from the remote client device 115, a user selection of a respective audio source from the one or more audio sources in the local area. The user selection indicates that the audio signals from the respective audio source are to be prioritized over audio signals from other audio sources in the local area during the communication session. In some embodiments, the user selection may directly indicate an audio mode for the communication session. In other embodiments, the communication system may receive the user selection as a user input from a local user via the user input device 122 rather than from the remote client device 115. The user input may be an interaction via a user interface, a voice command, or a selection of an application.

The communication system 120 obtains tracking data from the camera sub-system 126. The tracking data describes a location of the respective audio source in the local area within the field of view of the camera sub-system 126 of the communication system. The communication system 120 determines a depth of the respective audio source using the tracking data. In some embodiments, the communication system 120 also obtains image data from the camera sub-system 126 and uses body and facial detection on the image data to detect which user is speaking (i.e., is the respective audio source) during the communication session. The communication system 120 subsequently tracks the location of the user as the user moves around the local area using the tracking data and determines the depth of the user.

The communication system 120 determines whether the depth of the respective audio source relative to the communication system 120 is outside a distance threshold. If depth of the respective audio source relative to the communication system is at or within the distance threshold, the communication system 120 selects the near-field audio mode. If depth of the respective audio source relative to the communication system is outside the distance threshold, the communication system 120 selects the far-field audio mode. In some embodiments, the communication system may additionally select other audio modes, such as a virtual assistant mode.

The communication system 120 tunes 340 one or more microphones of the microphone sub-system 124 communication session based on the depth of the respective audio source relative to the communication system to optimize reception of audio signals originating from the respective audio source. For example, the communication system 120 may configure tuning parameters for the communication session based on the audio mode determined based on the depth. In particular, the communication system 120 may set the automatic gain control parameter higher for the far-field mode than the near field mode and may set the noise suppression parameter higher for the near-field mode than the far-field mode. Further, in embodiments where an application for a virtual assistant is running on the communication system 120, the communication system 120 may set the automatic gain control parameter at or below the setting of the automatic gain control parameter for the near-field mode and the noise suppression parameter at or below a setting of the noise suppression parameter for the far-field mode. The communication system may retrieve the parameters for the determined audio mode from the tuning parameter store 240 and may dynamically update the tuning parameters in real-time as the respective audio source moves around the local area.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   establishing, by a communication device, a communication session with another communication device via a network;
   capturing, via one or more cameras of the communication device, a local area within a field of view of the one or more cameras, the local area including one or more audio sources;
   receiving, from the other communication device via the network, a selection of a respective audio source from the one or more audio sources in the local area, wherein the selection indicates that audio originating from the respective audio source is to be prioritized over other audio sources in the local area; and
   tuning one or more microphones of the communication device based on a depth of the respective audio source relative to the communication device to optimize reception of audio originating at the respective audio source by the one or more microphones.

2. The method of claim 1, wherein tuning the one or more microphones based on the depth comprises:
   determining whether the depth of the respective audio source relative to the communication device is outside a distance threshold; and
   tuning the one or more microphones in accordance with a far-field mode in response to determining that the depth of the respective audio source relative to the communication device is outside the distance threshold.

3. The method of claim 2, wherein tuning the one or more of the microphones based on the depth comprises:
   tuning the one or more microphones in accordance with a near-field mode in response to determining that the depth of the respective audio source relative to the communication device is within the distance threshold.

4. The method of claim 1, wherein the tuning the one or more microphones based on the depth of the respective audio source relative to the communication device comprises adjusting one or more tuning parameters of the one or more microphones, and further wherein the one or more tuning parameters comprise an automatic gain control parameter, a noise suppression parameter, and an echo cancellation parameter.

5. The method of claim 1, wherein tuning the one or more microphones comprises:
   configuring an automatic gain control parameter based on the depth of the respective audio source relative to the communication device, wherein the automatic gain control parameter is set higher for a far-field mode than a near-field mode.

6. The method of claim 1, wherein tuning the one or more microphones comprises:
   configuring a noise suppression parameter based on the depth of the respective audio source relative to the communication device, wherein the noise suppression parameter is set higher for a near-field mode than a far-field mode.

7. The method of claim 1, wherein the respective audio source is a focal point in the local area.

8. The method of claim 1, wherein the selection is a voice command captured by the other communication device.

9. The method of claim 1, wherein tuning the one or more microphones is further based on an application running on the communication device, wherein the method further comprises:
   receiving another selection indicating an application running on the communication device; and
   responsive to determining that the application includes a virtual assistant, tuning the one or more microphones in accordance with a virtual assistant mode, wherein the tuning comprises setting an automatic gain control parameter at or below a setting of the automatic gain control parameter for a near-field mode and setting a noise suppression parameter at or below a setting of the noise suppression parameter for a far-field mode.

10. A non-transitory computer-readable storage medium storing executable instructions that, when executed by one or more processors, cause the one or more processors to perform steps comprising:
    establishing, by a communication device, a communication session with another communication device via a network;
    capturing, via one or more cameras of the communication device, a local area within a field of view of the one or more cameras, the local area including one or more audio sources;
    receiving, from the other communication device via the network, a selection of a respective audio source from the one or more audio sources in the local area, wherein the selection indicates that audio originating from the respective audio source is to be prioritized over other audio sources in the local area; and
    tuning the one or more microphones of the communication device based on a depth of the respective audio source relative to the communication device to optimize reception of audio originating at the respective audio source by the one or more microphones.

11. The non-transitory computer-readable storage medium of claim 10, wherein tuning the one or more microphones based on the depth comprises:
    determining whether the depth of the respective audio source relative to the communication device is outside a distance threshold; and
    tuning the one or more microphones in accordance with a far-field mode in response to determining that the depth of the respective audio source relative to the communication device is outside the distance threshold.

12. The non-transitory computer-readable storage medium 11, wherein tuning the one or more of the microphones based on the depth comprises:
tuning the one or more microphones in accordance with a near-field mode in response to determining that the depth of the respective audio source relative to the communication device is within the distance threshold.

13. The non-transitory computer-readable storage medium of claim 10, wherein tuning the one or more microphones based on the depth of the respective audio source relative to the communication device comprises adjusting one or more tuning parameters of the one or more microphones, and wherein the one or more tuning parameters, and further wherein the one or more tuning parameters comprise an automatic gain control parameter, a noise suppression parameter, and an echo cancellation parameter.

14. The non-transitory computer-readable storage medium of claim 10, wherein tuning the one or more microphones comprises:
configuring an automatic gain control parameter based on the depth of the respective audio source relative to the communication device, wherein the automatic gain control parameter is set higher for a far-field mode than a near-field mode.

15. The non-transitory computer-readable storage medium of claim 10, wherein tuning the one or more microphones comprises:
configuring a noise suppression parameter based on the depth of the respective audio source relative to the communication device, wherein the noise suppression parameter is set higher for a near-field mode than a far-field mode.

16. The non-transitory computer-readable storage medium of claim 10, wherein the respective audio source is a focal point in the local area.

17. The non-transitory computer-readable storage medium of claim 10, wherein the selection is a voice command captured by the other communication device.

18. The non-transitory computer-readable storage medium of claim 10, wherein tuning the one or more microphones is further based on an application running on the communication device, wherein the instructions further cause the processor to perform steps comprising:
receiving another selection indicating an application running on the communication device; and
responsive to determining that the application includes a virtual assistant, tuning the one or more microphones in accordance with a virtual assistant mode, wherein the tuning comprises setting an automatic gain control parameter at or below a setting of the automatic gain control parameter for a near-field mode and setting a noise suppression parameter at or below a setting of the noise suppression parameter for a far-field mode.

19. A communication device comprising:
one or more microphones;
one or more cameras;
one or more processors; and
memory storing one or more programs for execution by the one or more processors, the one or more programs including instruction for:
establishing a communication session with another communication device via a network;
capturing, via the one or more cameras, a local area within a field of view of the one or more cameras, the local area including one or more audio sources;
receiving, from the other communication device via the network, a selection of a respective audio source from the one or more audio sources in the local area, wherein the selection indicates that audio originating from the respective audio source is to be prioritized over other audio sources in the local area; and
tuning the one or more microphones based on a depth of the respective audio source relative to the communication device to optimize reception of audio originating at the respective audio source by the one or more microphones.

20. The computer system of claim 19, wherein tuning the one or more microphones based on the depth comprises:
determining whether the depth of the respective audio source relative to the communication device is outside a distance threshold; and
tuning the one or more microphones in accordance with a far-field mode in response to determining that the depth of the respective audio source relative to the communication device is outside the distance threshold.

* * * * *

UNITED STATES PATENT AND TRADEMARK OFFICE
CERTIFICATE OF CORRECTION

| | |
|---|---|
| PATENT NO. | : 11,202,148 B1 |
| APPLICATION NO. | : 16/881943 |
| DATED | : December 14, 2021 |
| INVENTOR(S) | : Pratik Mukesh Kamdar |

It is certified that error appears in the above-identified patent and that said Letters Patent is hereby corrected as shown below:

In the Claims

In Column 15, Claim 12, Line 2, delete "medium 11," and insert -- medium of claim 11, --, therefor.

In Column 16, Claim 20, Line 34, delete "computer system" and insert -- communication device --, therefor.

Signed and Sealed this
Thirtieth Day of August, 2022

Katherine Kelly Vidal
*Director of the United States Patent and Trademark Office*